United States Patent [19]
Kawamura et al.

[11] Patent Number: 5,826,117
[45] Date of Patent: Oct. 20, 1998

[54] TV CAMERA LENS DRIVING DEVICE AND TV CAMERA LENS

[75] Inventors: Hiroyuki Kawamura; Hiroshi Mizumura, both of Omiya, Japan

[73] Assignee: Fuji Photo Optical Co., Ltd., Saitama, Japan

[21] Appl. No.: 968,449

[22] Filed: Nov. 12, 1997

[30] Foreign Application Priority Data

Nov. 15, 1996 [JP] Japan ................................... 8-305134
Nov. 26, 1996 [JP] Japan ................................... 8-315216

[51] Int. Cl.$^6$ .............................. G03B 3/10; G03B 13/34; G02B 7/105
[52] U.S. Cl. .......................... 396/79; 348/357; 348/358; 359/705; 359/823; 396/103
[58] Field of Search ................................ 396/72, 79, 131, 396/76, 133, 103, 135, 136, 89; 348/239, 357, 358, 345; 359/705, 706, 823; 352/91 C, 91 R

[56] References Cited

U.S. PATENT DOCUMENTS 4,567,526  1/1986  Tsuchiya .................................. 348/357
5,075,713  12/1991  Sakata .................................. 348/357 X

FOREIGN PATENT DOCUMENTS 58-1401   1/1983  Japan .
60-46405  10/1985  Japan .

*Primary Examiner*—W. B. Perkey

[57] ABSTRACT

A TV camera lens of the present invention is provided with a position-control signal generating means for outputting a position-control signal representing a position where a master lens group should be positioned, and a rate-control signal generating means for outputting a rate-control signal representing a rate at which the master lens group should be moved. A position/rate control changeover means validates one of the position-control signal generating means and the rate-control signal generating means. A control circuit drives a motor to move the master lens group according to the rate-control signal or the position-control signal which is validated by the position/rate control changeover means. The TV camera lens is also provided with a limit circuit. A limit position, at which the master lens group stops when the master lens group moves under the rate control, is set to a proper flange back length position, which is adjusted under the position control. Thus, the master lens group can return to a previously-adjusted flange back length position under the rate control without fail.

9 Claims, 8 Drawing Sheets

F I G. 7
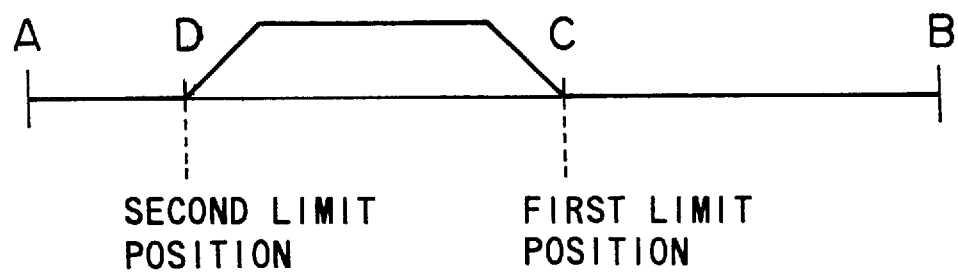
SECOND LIMIT
POSITION
FIRST LIMIT
POSITION

TV CAMERA LENS DRIVING DEVICE AND TV CAMERA LENS

BACKGROUND OF THE INVENTION

1. Field of the Invention

The present invention relates generally to a TV camera lens driving device and a TV camera lens, and more particularly to a technique for driving the TV camera lens which is able to form an optical system in which macro-shooting can be performed by moving a master lens group entirely or partially along the optical axis.

2. Description of Related Art

In a zoom lens used in a TV camera for broadcasting, a master lens group of a taking lens system is entirely or partially moved forward and backward along the optical axis to adjust the flange back length so that an object image can be sharply formed on an image receiving face. Thus, a flange back length adjustment (a tracking adjustment) can be performed. There is well known a TV camera lens which is constructed in such a way that the master lens group, which is moved forward and backward along the optical axis during the flange back length adjustment, is moved forward and backward along the optical axis in the macro-shooting so as to form the optical system for macro-shooting (refer to Japanese Patent Publication Nos. 58-1401 and 60-46405.)

Further, there are known such TV camera lens that the master lens group is divided into two groups including a macro lens group, which is moved in the macro-shooting, and another lens group for adjusting the flange back length, which is moved in the flange back length adjustment. During the macro-shooting, the macro lens group, which is a part of the master lens group, is moved and controlled.

The applicant of the present invention has proposed a TV camera lens in which the whole master lens group or a macro lens group in the master lens group is moved under position control or rate control (refer to Japanese Patent Application Nos. 8-251983 and 8-251984.)

In a TV camera, however, the whole master lens group or a lens group in the master lens group is moved under either one of the position control and the rate control.

Hence, in a TV camera which moves the lens group under the position control, when the lens group is moved for the purpose of achieving special effects in which a shot image is gradually obscured, the lens group cannot move smoothly, since the lens group is moved under the position control. On the other hand, in a TV camera which moves the lens group under the rate control, when the lens group is moved to a preset macro position, it is difficult and time-consuming to move the lens group to the proper macro position, since the lens group is moved under the rate control.

It is also difficult to move, under the rate control, the lens group from the obscuring state and correctly stop the lens group at a previously adjusted position of the proper flange back length.

SUMMARY OF THE INVENTION

The present invention has been developed in view of the above-described circumstances, and has as its object the provision of a TV camera lens driving device which is able to move the whole master lens group or a lens group in the master lens group under either the position control or the rate control in a TV camera.

Another object of the present invention is to provide the TV camera lens which is able to move the master lens group and stop the master lens group at a desired position under the rate control without fail.

To achieve the above-mentioned objects, a driving device of the present invention for a TV camera lens in which one of the whole of a master lens group arranged in a lens mount and a part of the master lens group is moved forward and backward along an optical axis so as to perform macro-shooting, and a macro position, at which the one of the whole of the master lens group and the part of the master lens group is positioned during the macro-shooting, is preset, the driving device comprises: a macro position-control signal generating means for outputting a macro position-control signal for moving the one of the whole of the master lens group and the part of the master lens group to the preset macro position; a rate-control signal generating means for outputting a rate-control signal for controlling a rate at which the one of the whole of the master lens group and the part of the master lens group moves, in accordance with operated amount of an operation member; a control changeover means for validating one of the macro position-control signal and the rate-control signal; and a lens driving means for moving the one of the whole of the master lens group and the part of the master lens group forward and backward along the optical axis in accordance with the control signal which is validated by the control changeover means.

According to the present invention, in a TV camera, the master lens group can be entirely or partially moved under either the position control or the rate control, and proper control is chosen in accordance with the situation. For example, in the case of the macro-shooting, the master lens group can be entirely or partially moved under the position control. In the case of the shooting to achieve the special effects in which an image is gradually obscured, the master lens group can be entirely or partially moved smoothly under the rate control.

To achieve the above-mentioned objects, a TV camera lens of the present invention comprises; a position control means for position controlling movement of a master lens group arranged in a lens mount; a rate control means for rate-controlling the movement of the master lens group; a position/rate control changeover means for choosing one of the position control means and the rate control means and for enabling the chosen control means to control the master lens group; and a limit means for limiting the movement of the master lens group with a limit position which is set to a position adjusted by the position control means, when the rate control means rate-controls the movement of the master lens group.

According to the present invention, the position/rate changeover means validates the position control means so as to move the master lens group under the position control. Then, the position/rate changeover means validates the rate control means so as to move the master lens group under the rate control. In this case, the limit position, at which the master lens group stops when the master lens group moves under the rate control, is set to the position where the master lens group is previously positioned under the position control. Thereby, the master lens group cannot move beyond the limit position under the rate control. Thus, under the rate control, the master lens group can be stopped at the position where the master lens group was originally positioned under the position control.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 7 is a view conceptualizing an area where the master lens group is movable under the rate control.

DETAILED DESCRIPTION OF THE PREFERRED EMBODIMENTS

This invention will hereunder be described in further detail with reference to the accompanying drawings.

Figure 1:
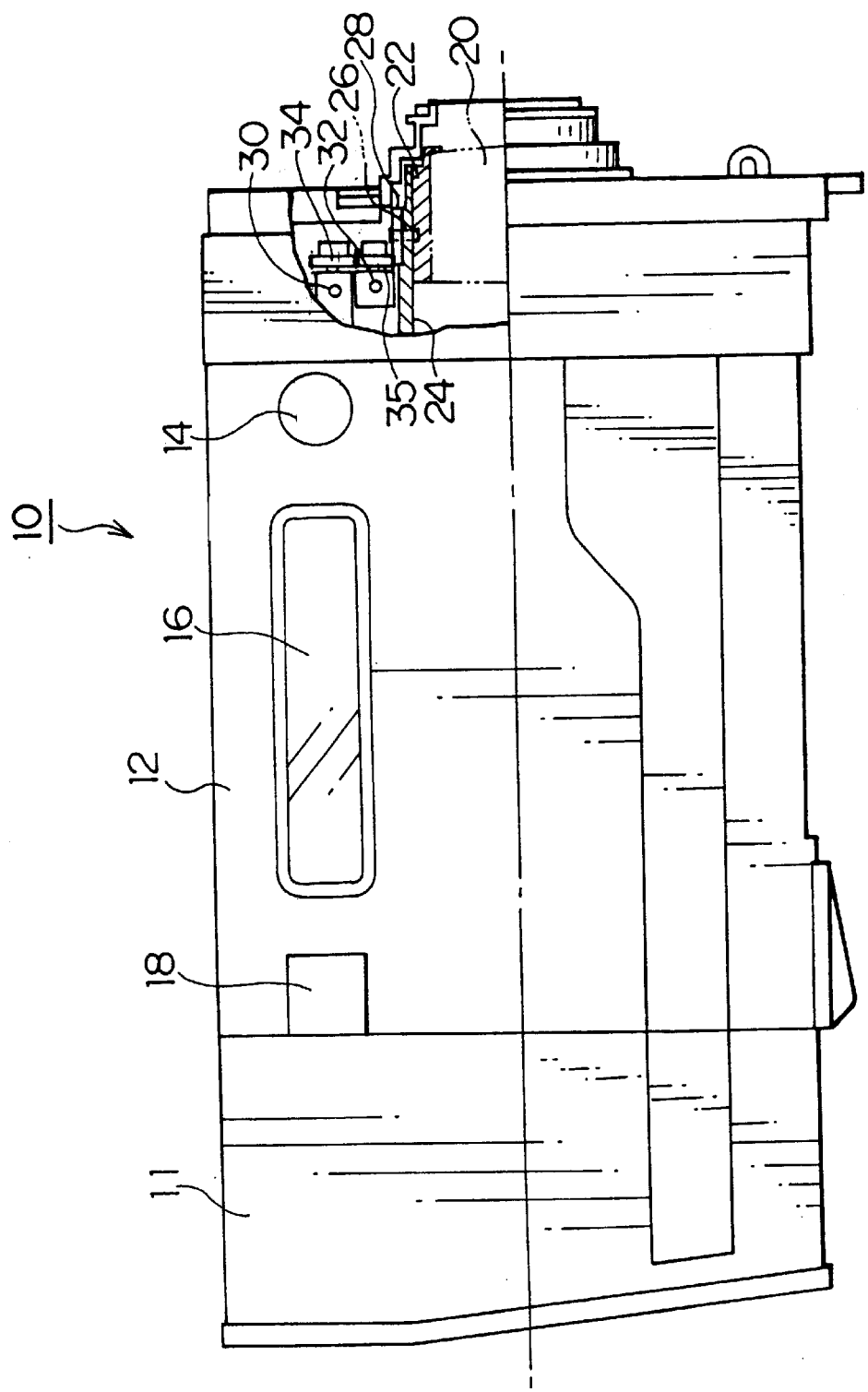
FIG. 1 is a side view illustrating a TV camera lens according to the present invention.

FIG. 1 is a side view illustrating an example of a TV camera lens which a TV camera lens driving device of the present invention applies to, and more particularly a TV camera lens which is able to move the whole master lens group forward and backward along the optical axis, thereby performing flange back length adjustment and macro-shooting. The inner structure of the TV camera lens is partially illustrated in FIG. 1. The front part of a lens body 10 is covered with a hood 11 at the left of the drawing, and the rear end face of the lens body 10 at the right of the drawing is fixed to a TV camera.

The lens body 10 is covered with a substantially rectangular-parallelepiped cover 12, which is detachably fixed to the lens body 10 with fixing screws 14 provided on the right and left sides of the cover 12. A recessed portion 16 is formed at the center of the upper section at the side of the cover 12, and the recessed portion 16 is grasped when the TV camera lens is carried. A tally lamp window 18 is formed in front of the recessed portion 16.

Although the interior of the lens body 10 is not illustrated in detail, a lens mount of the lens body 10 is provided therein with a fixed focus lens group, a movable focus lens group, the first movable zoom lens group, the second movable zoom lens group, a master lens group 20, and the like in order from the front.

A master lens mount 22 holds the master lens group 20, and the master lens group 20 connects to the end of a fixed lens mount 24 in a manner that the master lens group 20 can be moved forward and backward. A guide hole is formed on a peripheral surface of the fixed lens mount 24 such that the guide hole is parallel to the optical axis. A pin 26, which is attached to the master lens mount 22, is inserted into the guide hole. A cam cylinder 28 is rotatably mounted on the outer peripheral surface of the fixed lens mount 24, and a cam groove of a constant width is formed on the cam cylinder 28 diagonally to the optical axis. The pin 26 of the master lens mount 22 engages with the cam groove.

The lens body 10 is also provided with a motor 30 for driving the master lens group 20 and a potentiometer 32 for determining the position of the master lens group 20. A driving force of the motor 30 is transmitted to the cam cylinder 28 via gears 34 and 35. When the cam cylinder 28 rotates, the master lens group 20 mounted in the master lens mount 22 moves forward and backward with respect to the fixed lens mount 24. The potentiometer 32 outputs a position determination signal representing the determined position of the master lens group 20 according to the amount of rotation of the cam cylinder 28.

A description will hereunder be given of a drive control system of the master lens group 20.

Figure 2:
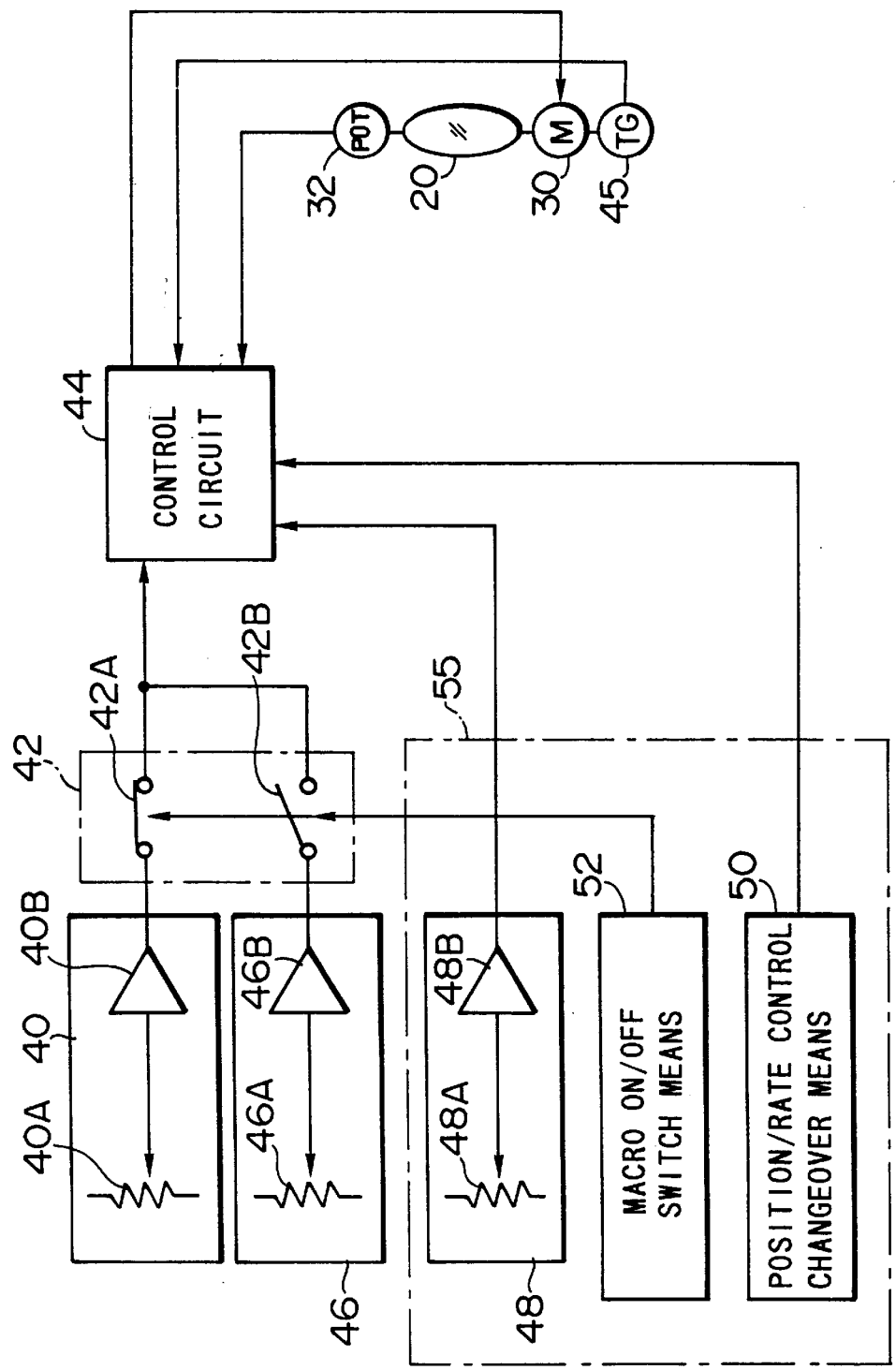
FIG. 2 is a block diagram illustrating the construction of a drive control system for a master lens group.

FIG. 2 is a block diagram illustrating the construction of a drive control system of the master lens group 20. A flange back length control signal generating means 40 is composed of a potentiometer 40A and an amplifier 40. When a flange back length adjustment knob (not shown) is turned, the flange back length control signal generating means 40 outputs an electric signal (a flange back length control signal) representing a position to which the master lens group 20 moves, in accordance with the amount of rotation of the flange back length adjustment knob. The output electric signal is input to a control circuit 44 via a switch means 42.

The TV camera lens is provided with a macro position-control signal generating means 46 for generating a signal representing a position to which the master lens group 20 should be moved, a macro rate-control signal generating means 48 for generating a signal representing a moving rate at which the master lens group 20 should be moved, and a position/rate control changeover means 50 for validating one of the position-control signal and the rate-control signal on the control circuit 44.

The macro position-control signal generating means 46 sets the master lens group 20 at a preset macro position, which is predetermined on the basis of a designed value, in the macro-shooting. The macro position-control signal generating means 46 is composed of a potentiometer 46A and an amplifier 46B. The potentiometer 46A is set to output a macro position-control signal for moving the master lens group 20 to the preset macro position. The output macro position-control signal or the flange back length control signal output from the flange back length control signal generating means 40 is selectively input to the control circuit 44.

The switch means 42 is an interlocking switch, in which armatures are switched in interlocking with a macro ON/OFF switch means 52, which is manipulated to select whether to perform the macro-shooting or not.

While the macro ON/OFF switch means 52 is off, an armature 42A of the switch means 42 is closed and an armature 42B is opened. Thereby, the control signal from the flange back length control signal generating means 40 is transmitted to the control circuit 44, and the control signal from the macro position-control signal generating means 46 is invalidated.

While the macro ON/OFF switch means 52 is on, the armature 42A of the switch means 42 is opened and the armature 42B is closed. Thereby, the control signal from the flange back length control signal generating means 40 is invalidated, and the control signal from the macro position-control signal generating means 46 is transmitted to the control circuit 44.

The macro rate-control signal generating means 48 includes a potentiometer 48A and an amplifier 48B, and outputs an electric signal (a rate-control signal) representing a moving rate of the master lens group 20 in accordance with an operated amount of an operation member (not shown), which is manipulated to control the moving rate of the master lens group 20. The output rate-control signal is transmitted to the control circuit 44.

The position/rate control changeover means 50 determines which to validate the position-control signal from the macro position-control signal generating means 46 or the rate-control signal from the macro rate-control signal generating means 48.

The control circuit 44 determines whether the position control or the rate control is chosen by the position/rate control changeover means 50, according to a signal from the position/rate control changeover means 50, and the control circuit 44 outputs a servo signal in accordance with the chosen control signal, thereby driving the motor 30.

When the motor 30 rotates, the cam cylinder 28 rotates in connection with the rotation as described previously, and the master lens group 20 moves forward and backward along the optical axis. The potentiometer 32 determines the position of the master lens group 20, and transmits the position determination signal representing the determined position of the master lens group 20 to the control circuit 44. The control circuit 44 compares the position represented with the position determination signal and the position represented with the position-control signal, and when these two positions correspond to one another, the control circuit 44 stops driving the motor 30. Thus, the position control can be accurate.

The motor 30 connects to a tachogenerator 45, which determines the number of rotations of the motor 30. The tachogenerator 45 transmits a signal representing the determined number of rotations to the control circuit 44, and the signal is used to control the rate of the motor 30.

A description will hereunder be given of the operation of the TV camera lens which is constructed in the above-mentioned manner.

First, the flange back length adjustment (the tracking adjustment) will be explained.

In order to adjust the flange back length, the macro ON/OFF switch means 52 in FIG. 2 is turned off, and thereby the armature 42B of the switch means 42 is opened and the armature 42A is closed. Thus, the control signal output from the flange back length control signal generating means 40 is transmitted to the control circuit 44. Moreover, the position/rate control changeover means 50 is set at the position control side, thereby invalidating the rate-control signal from the macro rate-control signal generating means 48. Then, the control circuit 44 outputs a servo signal for driving the motor 30 in accordance with the position-control signal from the flange back length control signal generating means 40.

In the above-mentioned state, the master lens group 20 is set to the proper focusing position (the position of the proper flange back length) by turning the flange back length adjustment knob, while the image-formation condition is observed through the view finder of the TV camera. The flange back length adjustment knob is preferably provided with a fixing means in order to prevent it from being shifted by an unexpected force, etc. after the flange back length adjustment is completed.

In the normal shooting thereafter, for example, a focus demand (a focus ring) is operated by the right hand so as to move a focus lens (the movable focus lens group), thereby adjusting the focus. A zoom demand (a zoom ring) is operated by the left hand so as to move a zoom lens group (the first and second zoom lens groups) in a proper optical positional relationship, thereby changing the magnification.

In the normal shooting, when the position/rate control changeover means 50 in FIG. 2 is set at the rate control side to validate the instruction from the macro rate-control signal generating means 48, and when the operation member (not shown) for controlling the moving rate of the master lens group 20 is operated, the macro rate-control signal generating means 48 outputs a rate-control signal according to the operated amount of the operation member to the control circuit 44. The control circuit 44 outputs a servo signal for driving the motor 30 in accordance with the rate-control signal from the macro rate-control signal generating means 48. Thus, the master lens group 20 smoothly moves along the optical axis, and the special effects can be achieved in which an image is naturally obscured.

At that time, although the control signal from the flange back length control signal generating means 40 is disregarded, the flange back length control signal generating means 40 maintains the state of outputting the position-control signal representing the previously-adjusted position of the master lens group 20 of the proper flange back length. Thus, if the position/rate control changeover means 50 is set at the position control side again after the operation to achieve the above-mentioned special effects, the position-control signal from the flange back length control signal generating means 40 is validated, and the master lens group 20 automatically returns to the previously-adjusted position of the proper flange back length.

Next, the macro-shooting will be explained.

In order to perform the macro-shooting after the flange back length adjustment, the macro ON/OFF switch means 52 in FIG. 2 is turned on, and the position/rate control changeover means 50 is set at the rate control side or the position control side. Then, the control circuit 44 validates the control signal from the macro position-control signal generating means 46 or the macro rate-control signal generating means 48 according to the instruction from the position/rate control changeover means 50. During this operation, although the control signal from the flange back length control signal generating means 40 is disregarded, the flange back length control signal generating means 40 maintains the state of outputting the position-control signal representing the previously-adjusted position of the master lens group 20 of the proper flange back length.

In the macro-shooting, the master lens group 20 can be moved under the position control. In order to move the master lens group 20 by controlling its position, the macro ON/OFF switch means 52 is turned on, and the position/rate control changeover means 50 is set at the position control side. With this operation, the armature 42A of the switch means 42 is opened and the armature 42B is closed. Thus, the control signal output from the macro position-control signal generating means 46 is transmitted to the control circuit 44.

The control circuit 44 receives both control signals from the macro position-control signal generating means 46 and from the macro rate-control signal generating means 48. The control circuit 44 validates the control signal from the macro position-control signal generating means 46 according to the instruction from the position/rate control changeover means 50, and outputs a servo signal for driving the motor 30 in accordance with the position-control signal from the macro position-control signal generating means 46. Thereby, the master lens group 20 moves to the preset macro position. During the macro-shooting, the zoom lens group is moved by operating the zoom ring so as to adjust the focus.

In the macro-shooting, the shooting with the above-mentioned special effects that an image is gradually obscured can be performed by switching the position/rate control changeover means 50 in FIG. 2 to the rate control side and operating the operation member for controlling the rate. If the position/rate control changeover means 50 is switched to the position control side after the operation to achieve the special effects, the control signal from the macro position-control signal generating means 46 is validated, and the master lens group 20 automatically returns to the macro position.

When the macro ON/OFF switch means 52 is turned off after the macro-shooting, the armatures of the switch means 42 are switched, and the control signal representing the position of the master lens group 20 of the proper flange back length position maintained by the flange back length control signal generating means 40 is transmitted to the control circuit 44. Thus, the master lens group 20 returns to the proper flange back length position.

On the other hand, the master lens group 20 can be moved under the rate control in the macro-shooting. In order to move the master lens group 20 by controlling its moving rate in the macro-shooting, the position/rate control changeover means 50 is set at the rate control side. The control circuit 44 validates the control signal from the macro rate-control signal generating means 48 according to the instruction from the position/rate control changeover means 50, and outputs a servo signal for driving the motor 30 in accordance with the rate-control signal from the macro rate-control signal generating means 48. Thereby, the moving rate of the master lens group 20 can be changed according to the operation of the operation member for controlling the rate. Thus, the master lens group 20 can be moved to the macro position under the rate control. In this case, the zoom lens group is moved by operating the zoom ring, so that the focus can be adjusted. As stated above, in the macro-shooting, the shooting with the above-mentioned special effects is performed by operating the operation member for controlling the rate.

If the position/rate control changeover means 50 is set at the position control side after the macro-shooting, the control circuit 44 validates the control signal representing the position of the master lens group 20 of the proper flange back length maintained by the flange back length control signal generating means 40, and thus the master lens group 20 automatically returns to the proper flange back length position.

According to this embodiment, the user can easily perform the flange back length adjustment, the macro-shooting and the shooting with the special effects in which an image is gradually obscured. After the macro-shooting or the shooting with the special effects, the master lens group 20 can repeatedly return to the previously-adjusted position of the proper flange back length without fail.

In this embodiment, the macro rate-control signal generating means 48, the macro ON/OFF switch means 52 and the position/rate control changeover means 50 are provided at the TV camera lens. The present invention, however, should not be restricted to this. An external controller including these means may be provided as indicated with an alternate long and short dash line denoted with the reference numeral 55 in FIG. 2, and the external controller 55 may be connected to the TV camera lens via a cable. The external controller 55 provided with the above-mentioned means may be attached to an area in proximity to a grip of a camera operating rod (a pan/tilt operation rod), so that the user can easily perform such as the macro-shooting and the shooting with the special effects.

In this embodiment, the same master lens group is moved during the macro-shooting and the flange back length adjustment, but the master lens group may be divided into two lens groups as described below so that each lens group can be moved.

Figure 3:
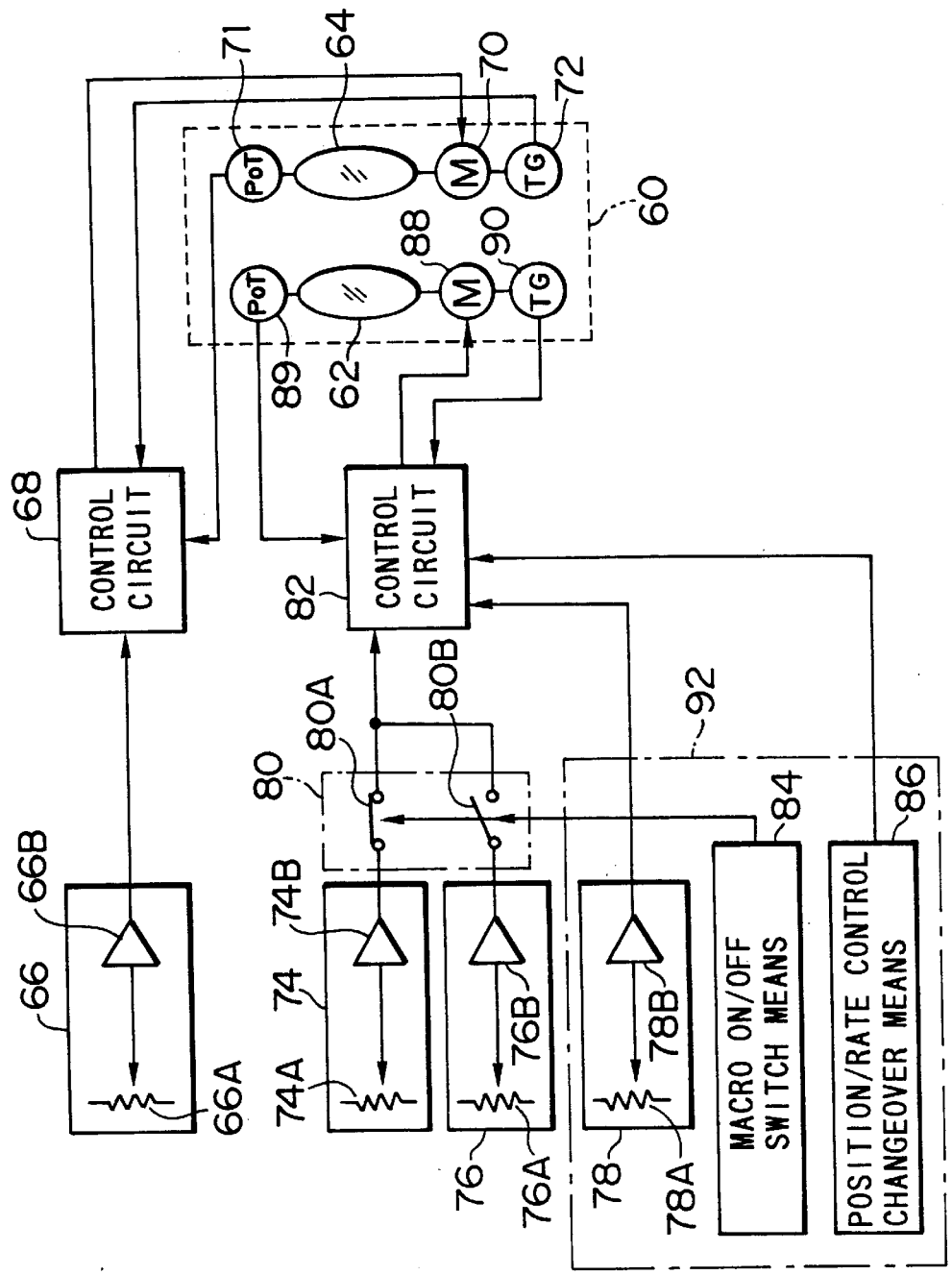
FIG. 3 is a block diagram illustrating an example of construction of the drive control system for the divided master lens group.

FIG. 3 is a block diagram illustrating an example of construction of a drive control system for a divided master lens group. A master lens group 60 is divided into a macro lens group 62, which is moved during the macro-shooting, and a tracking lens group 64, which is moved during the flange back length adjustment. The drive control system for the lens groups is composed of a tracking drive control system and a macro drive control system.

The tracking drive control system is composed mainly of a flange back length control signal generating means 66, a control circuit 68, a motor 70 and a potentiometer 71. The flange back length control signal generating means 66 is composed of a potentiometer 66A and an amplifier 66B. When a flange back length adjustment knob (not shown) is turned, the flange back length control signal generating means 66 outputs an electric signal representing a position to which the tracking lens group 64 moves, in accordance with the amount of rotation of the flange back length adjustment knob. The output electric signal is input to the control circuit 68.

The control circuit 68 outputs a servo signal in accordance with the input electric signal, thereby driving the motor 70. When the motor 70 rotates, the rotational force is transmitted to the tracking lens group 64 via a cam member (not shown), and thereby the tracking lens group 64 moves forward and backward along the optical axis and along a straight groove (not shown). The potentiometer 71 determines the position of the tracking lens group 64, and transmits a position determination signal representing the determined position of the tracking lens group 64 to the control circuit 68. The control circuit 68 compares the position represented with the position determination signal and the position represented with the signal from the flange back length control signal generating means 66, and when these two positions correspond to one another, the control circuit 68 stops driving the motor 70.

The motor 70 connects to a tachogenerator 72, which determines the number of rotations of the motor 70. The tachogenerator 72 transmits a signal representing the determined number of rotations to the control circuit 68, and the signal is used to control the rate of the motor 70.

A description will hereunder be given of the macro drive control system.

The macro drive control system is provided with the following two position-control signal generating means: a normal shooting position-control signal generating means 74 for generating a signal representing a standard position (a normal shooting position) where the macro lens group 62 should be positioned during the normal shooting; and a macro position-control signal generating means 76 for generating a signal representing a position to which the macro lens group 62 should be moved. The macro drive control system is also provided with a macro rate-control signal generating means 78 for generating a signal representing a moving rate at which the macro lens group 62 should be moved.

The normal shooting position-control signal generating means 74 is used for setting a position of the macro lens group 62 in the normal shooting state, which is defined at manufacturing. The normal shooting position-control signal generating means 74 is composed of a potentiometer 74A and an amplifier 74B. The potentiometer 74A is set to output a normal shooting position-control signal for moving the macro lens group 62 to the normal shooting position. The output normal shooting position-control signal is input to a control circuit 82 via a switch means 80.

The macro position-control signal generating means 76 is used for moving the macro lens group 62 at a preset macro position (previously determined position on the basis of the designed value) during the macroshooting, and is composed of a potentiometer 76A and an amplifier 76B. The potentiometer 76A is set to output a macro position-control signal for moving the macro lens group 62 to the preset macro position. One of the macro position-control signal and the normal shooting position-control signal is selectively input to the control circuit 82 via the switch means 80.

The switch means 80 is an interlocking switch, in which armatures are switched in interlocking with a macro ON/OFF switch means 84, which is manipulated to select whether to perform the macro-shooting or not. While the macro ON/OFF switch means 84 is off, an armature 80A of the switch means 80 is closed and an armature 80B is opened. Thereby, the control signal from the normal shooting position-control signal generating means 74 is transmitted to the control circuit 82, and the control signal from the macro position-control signal generating means 76 is invalidated. On the other hand, while the macro ON/OFF switch means 84 is on, the armature 80A of the switch means 80 is opened and the armature 80B is closed. Thereby, the control signal from the normal shooting position-control signal generating means 74 is invalidated, and the control signal from the macro position-control signal generating means 76 is transmitted to the control circuit 82.

The macro rate-control signal generating means 78 includes a potentiometer 78A and an amplifier 78B, and outputs an electric signal (a rate-control signal) representing a moving rate of the macro lens group 62 in accordance with an operated amount of an operation member (not shown), which is manipulated to control the moving rate of the macro lens group 62. The output rate-control signal is transmitted to the control circuit 82.

The lens drive control system is provided with a position/rate control changeover means 86 for validating one of the position-control signal from the macro position-control signal generating means 76 and the rate-control signal from the macro rate-control signal generating means 78.

The control circuit 82 determines whether the position control or the rate control is chosen by the position/rate control changeover means 86, according to a signal from the position/rate control changeover means 86, and the control circuit 82 outputs a servo signal in accordance with the chosen control signal, thereby driving a motor 88.

When the motor 88 rotates, the cam cylinder 28 is rotated by the rotational force of the motor 88 as stated previously, and the macro lens group 62 moves forward and backward along the optical axis. A potentiometer 89 determines the position of the macro lens group 62, and transmits a position determination signal representing the determined position of the macro lens group 62 to the control circuit 82.

The control circuit 82 compares the position represented with the position determination signal and the position represented with the chosen position-control signal from the normal shooting position-control signal generating means 74 or the macro position-control signal generating means 76, and when these two positions correspond to one another, the control circuit 82 stops driving the motor 88. Thus, the position control can be accurate.

The motor 88 connects to a tachogenerator 90, which determines the number of rotations of the motor 88. The tachogenerator 90 transmits a signal representing the determined number of rotations to the control circuit 82, and the signal is used to control the rate of the motor 88.

A description will hereunder be given of the operation of the TV camera lens which is constructed in the above-mentioned manner.

First, the flange back length adjustment will be explained.

In order to adjust the flange back length, the macro ON/OFF switch means 84 in FIG. 3 is turned off, and thereby the armature 80B of the switch means 80 is opened and the armature 80A is closed. Thus, the position-control signal from the normal shooting position-control signal generating means 74 is transmitted to the control circuit 82. Moreover, the position/rate control changeover means 86 is set at the position control side, thereby invalidating the rate-control signal from the macro rate-control signal generating means 78. Then, the control circuit 82 outputs a servo signal for driving the motor 88 in accordance with the position-control signal from the normal shooting position-control signal generating means 74. Thus, the macro lens group 62 moves to a predetermined standard position.

In the above-mentioned state, the tracking lens group 64 is set to the proper focusing position (the position of the proper flange back length) by turning the flange back length adjustment knob, while the image-formation condition is observed through the view finder of the TV camera.

In the normal shooting thereafter, for example, the focus demand (the focus ring) is operated by the right hand so as to move the focus lens (the movable focus lens group), thereby adjusting the focus. The zoom demand (the zoom ring) is operated by the left hand so as to move the zoom lens group (the first and second zoom lens groups) in a proper optical positional relationship, thereby changing the magnification.

In the normal shooting, when the position/rate control changeover means 86 in FIG. 3 is set at the rate control side to validate the instruction from the macro rate-control signal generating means 78, and when the operation member (not shown) for controlling the moving rate of the macro lens group 62 is operated, the macro rate-control signal generating means 78 outputs a rate-control signal according to the operated amount of the operation member to the control circuit 82. The control circuit 82 outputs a servo signal for driving the motor 88 in accordance with the rate-control signal from the macro rate-control signal generating means 78. Thus, the macro lens group 62 smoothly moves along the optical axis, and the special effects can be achieved in which an image is naturally obscured.

At that time, although the control signal from the normal shooting position-control signal generating means 74 is disregarded, the normal shooting position-control signal generating means 74 maintains the state of outputting the position-control signal representing the normal shooting position of the macro lens group 62 defined at manufacturing. Thus, if the position/rate control changeover means 86 is set at the position control side again after the operation to achieve the above-mentioned special effects, the position-control signal from the normal shooting position-control signal generating means 74 is validated, and the macro lens group 62 automatically returns to the normal shooting position. Thereby, the previously-adjusted flange back length can be reproduced.

Next, the macro-shooting will be explained.

In order to perform the macro-shooting after the flange back length adjustment, the macro ON/OFF switch means 84 in FIG. 3 is turned on, and the position/rate control changeover means 86 is set at the rate control side or the position control side. Then, the control circuit 82 validates the control signal from the macro position-control signal generating means 76 or the macro rate-control signal generating means 78 according to the instruction from the position/rate control changeover means 86.

In the macro-shooting, in order to move the macro lens group 62 by controlling its position, the macro ON/OFF switch means 78 is turned on, and the position/rate control changeover means 86 is set at the position control side. With this operation, the armature 80A of the switch means 80 is opened and the armature 80B is closed. Thus, the control signal output from the macro position-control signal generating means 76 is transmitted to the control circuit 82.

The control circuit 82 receives both control signals from the macro position-control signal generating means 76 and from the macro rate-control signal generating means 78. The control circuit 82 validates the control signal from the macro position-control signal generating means 76 according to the instruction from the position/rate control changeover means 86, and outputs a servo signal for driving the motor 88 in accordance with the position-control signal from the macro position-control signal generating means 76. Thereby, the macro lens group 62 moves to the preset macro position. During the macro-shooting, the zoom lens group is moved by operating the zoom ring so as to adjust the focus.

In the macro-shooting, the shooting with the above-mentioned special effects that an image is gradually obscured can be performed by switching the position/rate control changeover means 86 in FIG. 3 to the rate control side and operating the operation member for controlling the rate. If the position/rate control changeover means 86 is switched to the position control side after the operation to achieve the special effects, the control signal from the macro position-control signal generating means 76 is validated, and the macro lens group 62 returns to the macro position.

After the macro-shooting, when the macro ON/OFF switch means 84 is turned off and the position/rate control means 86 is switched to the position control side, the control signal representing the normal shooting position output from the normal shooting position-control signal generating means 74 is transmitted to the control circuit 82. Thus, the macro lens group 62 returns to the normal shooting position.

On the other hand, the macro lens group 62 can be moved under the rate control in the macro-shooting. In order to move the macro lens group 62 by controlling its moving rate in the macro-shooting, the position/rate control changeover means 86 is set at the rate control side. The control circuit 82 validates the control signal from the macro rate-control signal generating means 78 according to the instruction from the position/rate control changeover means 86, and outputs a servo signal for driving the motor 88 in accordance with the rate-control signal from the macro rate-control signal generating means 78. Thereby, the moving rate of the macro lens group 62 can be changed according to the operation of the operation member for controlling the rate. Thus, the macro lens group 62 can be moved to the macro position under the rate control. In this case, the zoom lens group is moved by operating the zoom ring, so that the focus can be adjusted.

As stated above, the user can easily perform the flange back length adjustment, the macro-shooting and the shooting with the special effects in which an image is gradually obscured. After the macro-shooting or the shooting with the special effects, the macro lens group 62 can repeatedly return to the normal shooting position defined at manufacturing.

In this embodiment, the macro rate-control signal generating means 78, the macro ON/OFF switch means 84 and the position/rate control changeover means 86 are provided at the TV camera lens. The present invention, however, should not be restricted to this. An external controller including these means may be provided as indicated with an alternate long and short dash line denoted with the reference numeral 92 in FIG. 3, and the external controller 92 may be connected to the TV camera lens via a cable. The external controller 92 provided with the above-mentioned means may be attached to an area in proximity to a grip of a camera operation rod (a pan/tilt operation rod), so that the user can easily perform such as the macro-shooting and the shooting with the special effects.

Figure 4:
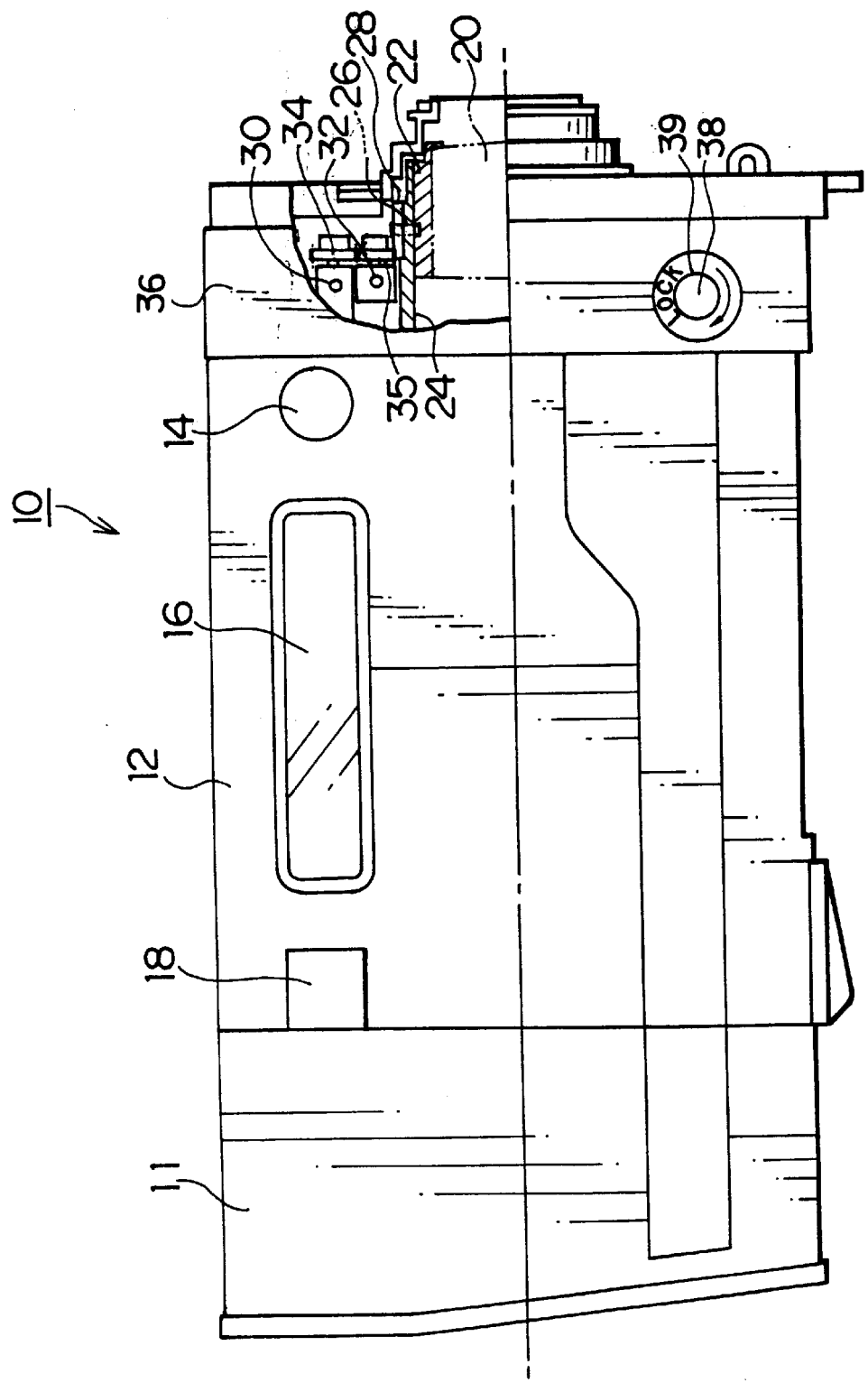
FIG. 4 is a side view illustrating a TV camera lens according to the present invention.

FIG. 4 is a side view of the TV camera lens which the present invention applies to, and partially illustrates the inner structure of the TV camera lens. Parts similar to those in FIG. 1 are denoted by the same reference numerals, and the explanation will be omitted.

The flange back length adjustment knob 38, which is manipulated to drive the master lens group 20, is provided at the lower part of the side of a mount frame 36. The flange back length adjustment knob 38 is provided with a potentiometer (not shown) which outputs a position-control signal in accordance with the turning amount of the flange back length adjustment knob 38. The output position-control signal is input to a control circuit 152 (not shown in FIG. 4 and see FIG. 5), and the control circuit 152 outputs a servo signal to drive the motor 30 according to the position-control signal. When the motor 30 rotates, the rotational force thereof is transmitted to the potentiometer 32 and the cam cylinder 28 via the gears 34 and 35, and thereby the master lens mount 22 moves forward and backward along the optical axis.

Thus, by turning the flange back length adjustment knob 38, the master lens group 20 is moved forward and backward along the optical axis under the position control, and thereby an image-formation position of the TV camera lens can be adjusted on an image receiving face of the TV camera. Thus, the flange back length of the TV camera lens can be adjusted.

A fixing knob 39 is provided coaxially with the flange back length adjustment knob 38. The fixing knob 39 locks the flange back length adjustment knob 38 so as to prevent the flange back length position, which was adjusted by the flange back length adjustment knob 38, from shifting. That is, after the position of the master lens group 20 is adjusted by manipulating the flange back length adjustment knob 38, the fixing knob 39 is turned clockwise to fix the rotary axis of the flange back length adjustment knob 38, thereby preventing the adjusted position of the master lens group 20 from moving due to an unexpected external force.

The drive control system of the master lens group 20 will now be explained.

Figure 5:
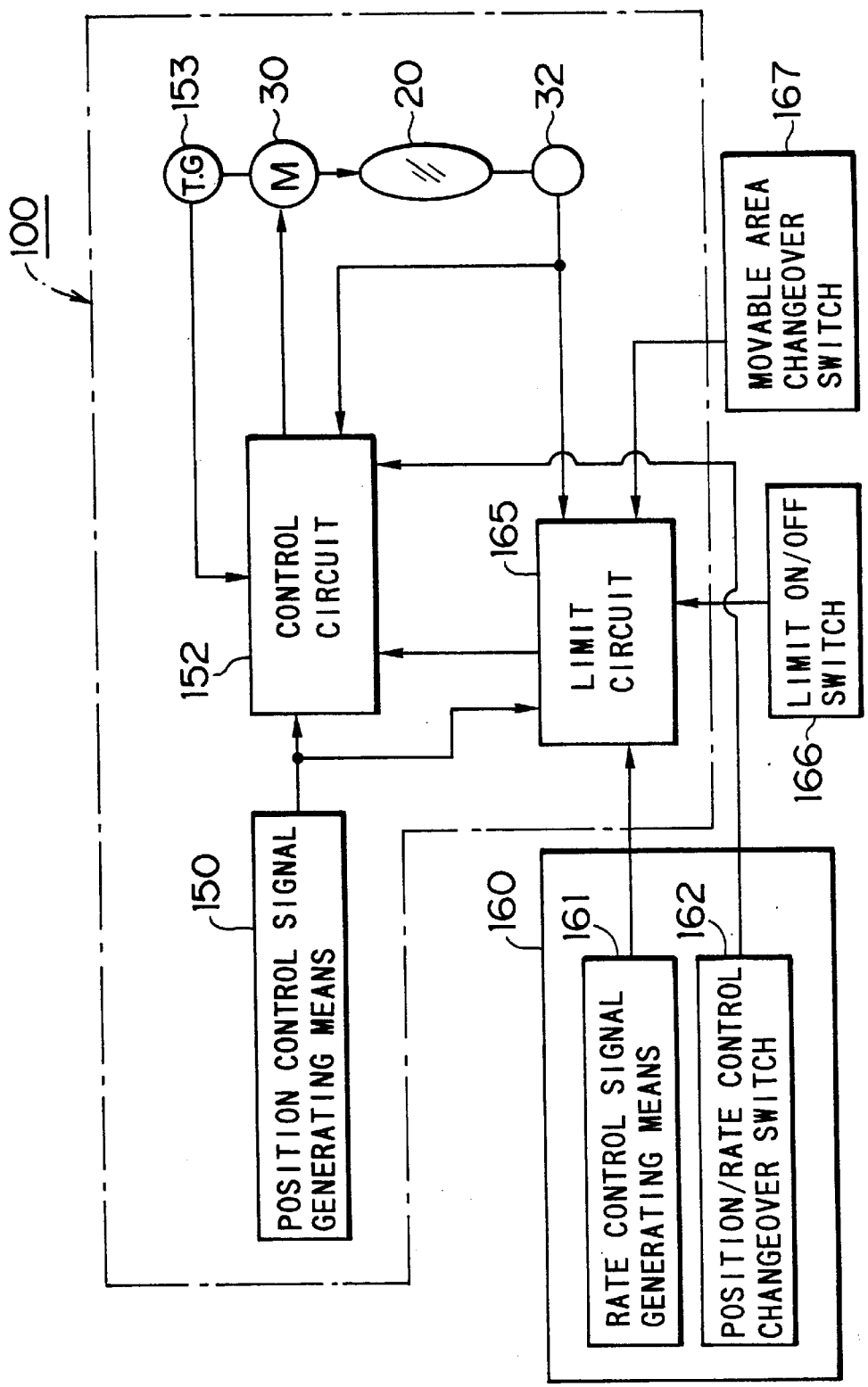
FIG. 5 is a block diagram illustrating the construction of a drive control system for a master lens group.

FIG. 5 is a block diagram illustrating the construction of the drive control system of the master lens group 20. The TV camera lens 100 is provided with a position-control signal generating means 150, a control circuit 152, a limit circuit 165, etc. which control the master lens group 20.

The position-control signal generating means 150 is equivalent to the flange back length adjustment knob 38 in FIG. 4 and the potentiometer provided at the knob 38. When the flange back length adjustment knob 38 is turned, the position-control signal generating means 150 outputs an electric signal representing a position to which the master lens group 20 should be moved. The output electric signal is input to the control circuit 152.

The control circuit 152 outputs a servo signal in accordance with the input electric signal so as to drive the motor 30. When the motor 30 rotates, the cam cylinder 28 rotates as stated previously, and the master lens group 20 moves forward and backward along the optical axis. The potentiometer 32 determines the position of the master lens group 20, and transmits the position determination signal representing the determined position of the master lens group 20 to the control circuit 152. The control circuit 152 stops driving the motor 30 when the position represented with the position determination signal and the position represented with the position-control signal output from the position-control signal generating means 150 correspond to one another. Thereby, the position control can be accurate.

The motor 30 connects to a tachogenerator 153, which determines the number of rotations of the motor 30. The tachogenerator 153 transmits a signal representing the determined number of rotations to the control circuit 152, and the signal is used to control the rate of the motor 30.

The TV camera lens 100 connects to a rate controller 160. The rate controller 160 is provided with a rate-control signal generating means 161 for generating a rate-control signal and a position/rate changeover switch 162 for validating one of the position-control signal from the position-control signal generating means 150 and the rate-control signal from the rate-control signal generating means 161.

When the position/rate changeover switch 162 is set at the position control side, the position/rate changeover switch 162 sends a signal indicating that to the control circuit 152 of the TV camera lens 100. The instruction from the position-control signal generating means 150 is validated, and the instruction from the rate-control signal generating means 161 is invalidated. That is, the control circuit 152 disregards the control signal from the rate-control signal generating means 161, and outputs a servo signal in accordance with the position-control signal from the position-control signal generating means 150. Then, the master lens group 20 is driven by the motor 30 according to the servo signal, and the flange back length is adjusted.

On the other hand, when the position/rate changeover switch 162 is set at the rate control side, the position/rate changeover switch 162 sends a signal indicating that to the control circuit 152 via the limit circuit 165. The instruction from the rate-control signal generating means 161 is validated, and the instruction from the position-control signal generating means 150 is invalidated. That is, the control circuit 152 disregards the control signal from the position-control signal generating means 150, and outputs the servo signal in accordance with the rate-control signal from the rate-control signal generating means 161.

In this case, the limit circuit 165 receives the position-control signal representing the previously-adjusted flange back length position from the position-control signal generating means 150, and the limit circuit 165 sets a limit position, which limits an area where the master lens group 20 is movable, at the flange back length position. The limit circuit 165 also receives the position determination signal representing the position of the master lens group 20 from the potentiometer 32. The limit circuit 165 prevents the master lens group 20 from moving out of the limited movable area. Thereby, the master lens group 20 can be returned to the previously-adjusted flange back length position under the rate control without fail.

The limit circuit 165 connects to a limit ON/OFF switch 166 which can cancel the limiting over the movement of the master lens group 20 under the rate control. Thus, the master lens group 20 can be moved under the normal rate control without the limit.

The limit circuit 165 connects to a movable area changeover switch 167, which chooses the limited movable area of the master lens group 20 under the rate control from the following two areas: an area between the limit position and the front end of the natural movable area, where the master lens group 20 is naturally movable if there is no limit over the movement, and an area between the limit position and the rear end of the natural movable area. The limit circuit 165 is provided at the TV camera lens 100, but it may be provided at the rate controller 160.

A detailed description will hereunder be given of the operation of the TV camera lens which is constructed in the above-mentioned manner.

Figure 8:
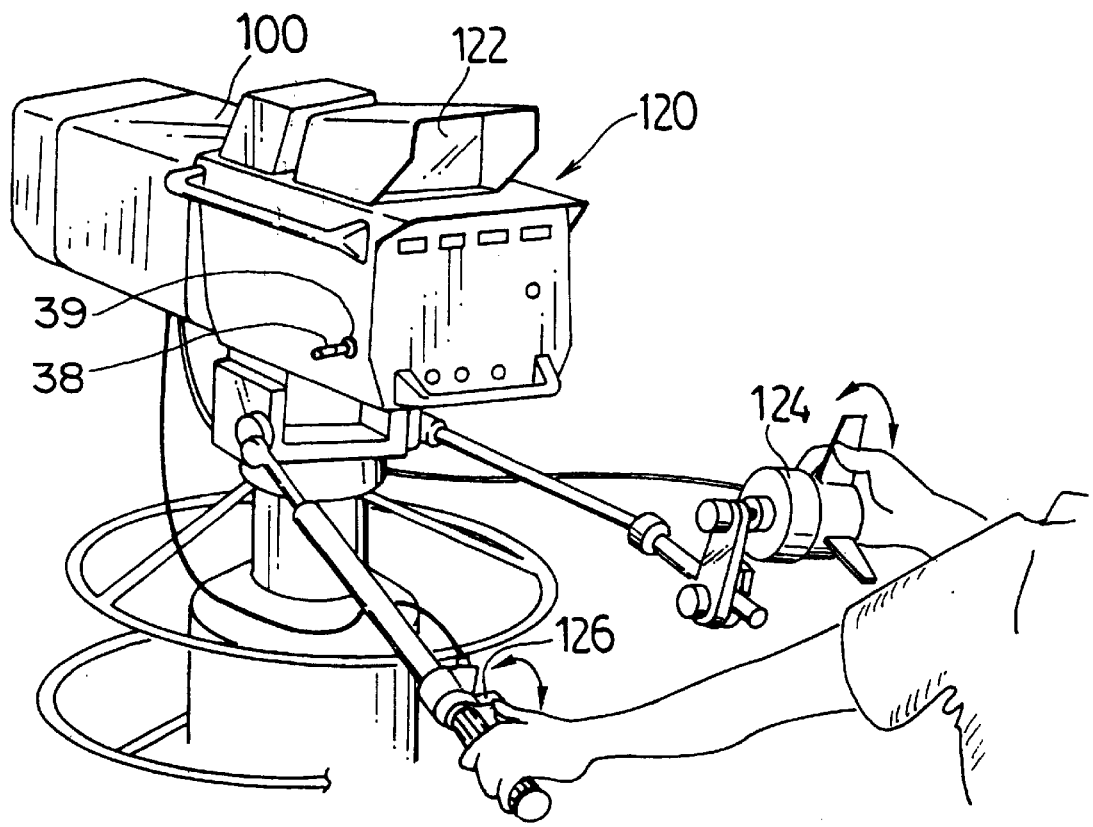
FIG. 8 is a perspective view illustrating the operation of the TV camera lens.

First, the position/rate changeover switch 162 is set at the position control side, thereby validating the control signal from the position-control signal generating means 150. Then, the master lens group 20 is set to the proper focusing position (the position of the proper flange back length) by turning the flange back length adjustment knob 38, while the image-formation condition is observed through the view finder 122 of the TV camera 120 (see FIG. 8).

When the flange back length adjustment is completed, the fixing knob 39 is turned to fix the rotational axis of the flange back length control 38, thereby preventing the adjusted flange back length position from shifting due to an unexpected force, etc.

In the normal shooting thereafter, for example, the focus demand (the focus ring) 124 is operated by the right hand so as to move the focus lens (the movable focus lens group), thereby adjusting the focus. The zoom demand (the zoom ring) 126 is operated by the left hand so as to move the zoom lens group (the first and second zoom lens groups) in a proper optical positional relationship, thereby changing the magnification. The focus ring 124 outputs a position-control signal, and the focus lens is driven according to the position-control signal. On the other hand, the zoom controller including the zoom ring 126 outputs a rate-control signal, and the zoom lens group is driven according to the rate-control signal.

In the case of the shooting aiming at achieving the special effects in which an image is gradually obscured, the position/rate changeover switch 162 is set at the rate control side, and the instruction from the rate-control signal generating means 161 is validated. During this operation, although the control signal from the flange back length control signal generating means 150 is disregarded, the flange back length control signal generating means 150 maintains the state of outputting the position-control signal representing the previously-adjusted position of the master lens group 20 of the proper flange back length. Then, the movable area changeover switch 167 sets the limited movable area of the master lens group 20, and the operation member of the rate-control signal generating means 161 is operated to move the master lens group 20. The master lens group 20 smoothly moves along the optical axis from the proper flange back length position according to the rate-control signal. Thus, the image is naturally obscured. Such special effects can be easily achieved.

When the master lens group 20 moves from the obscuration state to the previously-adjusted flange back length position under the rate control, the master lens group 20 moves to the flange back length position at desired rate. The potentiometer 32 determines the position of the master lens group 20. When the limit circuit 165 receives the information that the master lens group 20 is located at the previously-set flange back length position, the rate instruction is forcibly set to 0, and the motor 30 stops to be driven. Thereby, the master lens group 20 can be moved to the previously-adjusted flange back length position under the rate control without fail.

If a limit cancel signal is input to the limit circuit 165 from the limit ON/OFF switch 166, the control to stop the macro lens group 20 at the limit position is canceled, and then the master lens group 20 can be moved under the rate control in a normal way. In the macro-shooting, the master lens group 20 is moved under the rate control. In this case, the zoom lens group is moved by operating the zoom ring 126 in FIG. 8, so that the focus can be adjusted. If the position/rate changeover switch 162 is set at the position control side again after the operation to achieve the special effects or the macro-shooting, the control signal from the position-control signal generating means 150 is validated, and the master lens group 20 automatically returns to the previously-adjusted flange back length position.

Once the flange back length position is adjusted, the instruction as to the flange back length position is maintained by the position-control signal generating means 150. Thus, the master lens group 20 can automatically and repeatedly return to the proper flange back length position.

Figure 6:
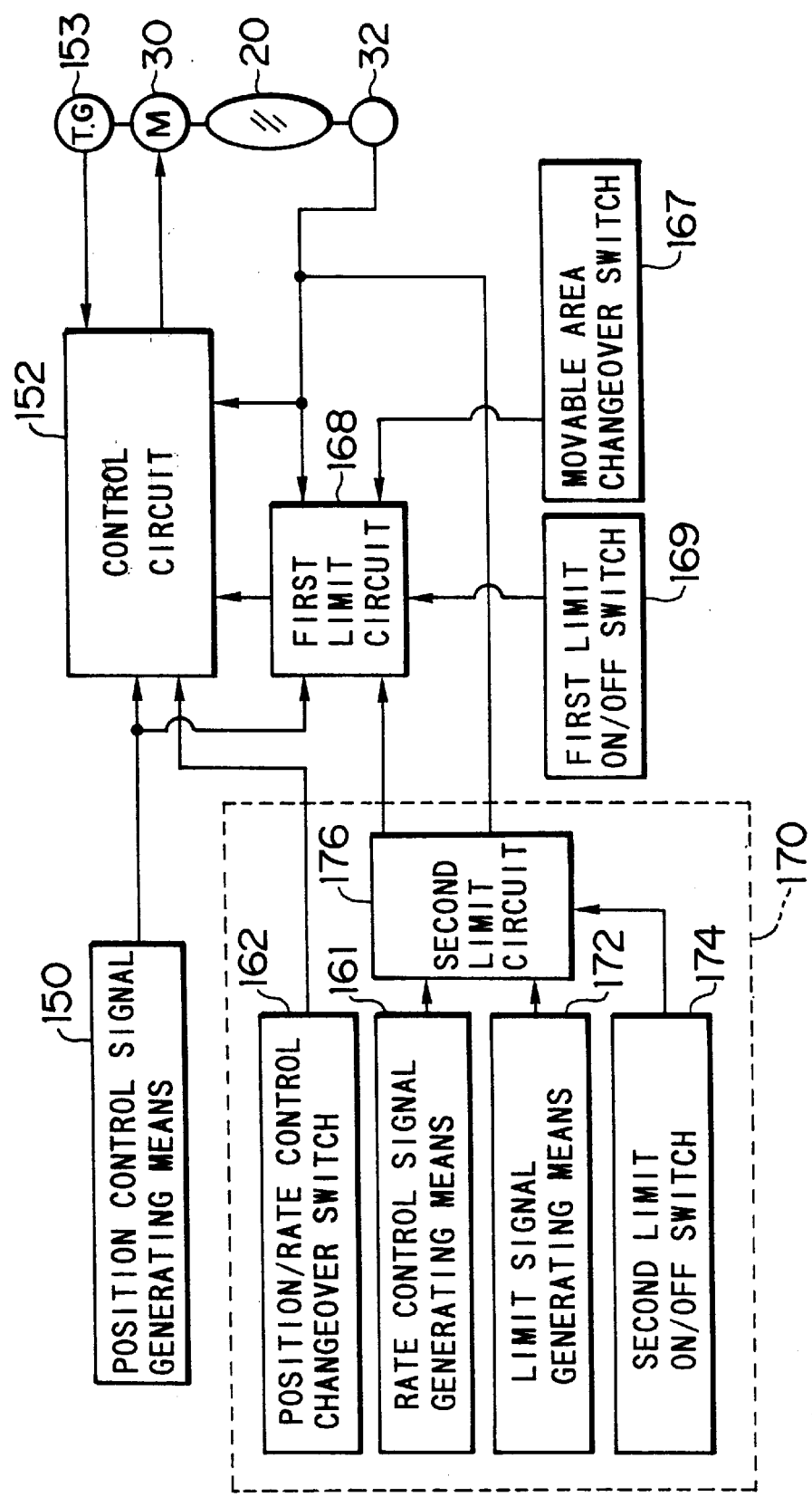
FIG. 6 is a block diagram illustrating another construction of the drive control system for the master lens group.

FIG. 6 is a block diagram illustrating another embodiment of the drive control system of the master lens group in the TV camera lens according to the present invention. Parts similar to those described with reference to FIG. 5 are denoted by the same reference numerals, and a detailed explanation will be omitted. A first limit circuit 168 and a first limit ON/OFF switch 169 shown in FIG. 6 have the same functions as the limit circuit 165 and the limit ON/OFF switch 166 shown in FIG. 5.

The embodiment described in FIG. 6 is different from the embodiment in FIG. 5 in that a rate controller 170 is provided instead of the rate controller 160 in FIG. 5.

The rate controller 170 is provided with a limit signal generating means 172, a second limit ON/OFF switch 170 and a second limit circuit 176 in addition to the rate-control signal generating means 161 and the position/rate changeover switch 162 in FIG. 5.

The user manually sets a position (the second limit position) to limit the movement of the master lens group 20, and the limit signal generating means 172 outputs an electric signal representing the second limit position. The electric signal is input to the second limit circuit 176.

The second limit circuit 176 receives a rate-control signal from the rate-control signal generating means 161 and a position determination signal representing the position of the master lens group 20 from the potentiometer 32. The second limit circuit 176 usually outputs the rate-control signal from the rate-control signal generating means 161 directly to the first limit circuit 168, but if the position of the master lens group 20 determined by the potentiometer 32 reaches the second limit position set by the limit signal generating means 172, the second limit circuit 176 sets the rate instruction to 0, which is transmitted to the first limit circuit 168, regardless of the rate instruction from the rate-control signal generating means 161. Thus, when the master lens group 20 is moved under the rate control, the master lens group 20 can stop at the second limit position set by the limit signal generating means 172 as well as the position (the first limit position) set by the position-control signal generating means 150. The limit circuit 176 is provided at the rate controller 170, but it may be provided at the TV camera lens as is the case with the first limit circuit 168.

FIG. 7 is a view conceptualizing an area where the master lens group 20 is movable in the embodiment described in FIG. 6. In FIG. 7, positions A and B are mechanical limit positions which the master lens group 20 can reach, that is, the front and rear ends of the natural movable area of the master lens group 20. A position C is the first limit position adjusted by the position-control signal generating means 150.

If the limit signal generating means 172 sets the position D as the second limit position in FIG. 7, and if the movable area changeover switch 167 chooses the limit movable area under the rate control between the positions A and C, the master lens group 20 is only movable between the positions C and D. The second limit position D may be set between the positions C and B, but in this case the movable area changeover switch 167 must choose the limit movable area between the positions C and B. In this embodiment, there is provided only one limit signal generating means 172 for setting the position D, but two pieces of limit signal generating means may be provided to set two limit positions at the right and left sides in FIG. 7.

In this embodiment, the description was given of the movement of the whole master lens group, but the present invention may also be applied when a part of the master lens group is moved.

In these embodiments, the lens groups are moved by the cam groove and the cam cylinder which are coupled together by the pin, but a helicon mechanism may be used which is well known in the lens driving technique.

As stated above, according to the TV camera lens driving device of the present invention, the macro position-control signal generating means and the macro rate-control signal generating means are provided to control the movement of the master lens group entirely or partially, and the changeover means is provided to change over the above-mentioned two means. Thus, the master lens group can be entirely or partially moved under the position control or the rate control depending on the situation. For example, in order to move the master lens group entirely or partially to the preset macro position, the master lens group can be moved under the position control, and the lens group can be correctly moved to the macro position.

In order to achieve the special effects in which an image is gradually obscured, the lens group can be moved under the rate control. Thus, the lens group can be moved smoothly along the optical axis, and the image can be naturally obscured.

Furthermore, according to the TV camera lens of the present invention, the limit position is set to the position adjusted by the position control means, and the movable area of the master lens group under the rate control is limited with the limit position, and thus the master lens group can be stopped at the desired position under the rate control without fail.

It is possible to set a limit position which is different from the limit position set by the position control means, and therefore, the master lens group can be stopped without fail at each limit position during the movement between the two limit positions under the rate control.

It should be understood, however, that there is no intention to limit the invention to the specific forms disclosed, but on the contrary, the invention is to cover all modifications, alternate constructions and equivalents falling within the spirit and scope of the invention as expressed in the appended claims.

We claim:

1. A driving device for a TV camera lens in which one of the whole of a master lens group arranged in a lens mount and a part of said master lens group is moved forward and backward along an optical axis so as to perform macro-shooting, and a macro position, at which the one of the whole of said master lens group and the part of said master lens group is positioned during the macro-shooting, is preset, said driving device comprising:

macro position-control signal generating means for outputting a macro position-control signal for moving the one of the whole of said master lens group and the part of said master lens group to the preset macro position;

rate-control signal generating means for outputting a rate-control signal for controlling a rate at which the one of the whole of said master lens group and the part of said master lens group moves, in accordance with operated amount of an operation member;

control changeover means for validating one of the macro position-control signal and the rate-control signal; and lens driving means for moving the one of the whole of said master lens group and the part of said master lens group forward and backward along the optical axis in accordance with the control signal which is validated by said control changeover means.

2. A TV camera lens comprising:

position control means for position-controlling movement of a master lens group arranged in a lens mount;

rate control means for rate-controlling the movement of said master lens group;

position/rate control changeover means for choosing one of said position control means and said rate control means and for enabling the chosen control means to control said master lens group; and limit means for limiting the movement of said master lens group with a limit position which is set to a position adjusted by said position control means, when said rate control means rate-controls the movement of said master lens group.

3. The TV camera lens as defined in claim 2, further comprising limit cancel means for canceling the limiting over the movement of said master lens group by said limit means.

4. The TV camera lens as defined in claim 2, further comprising movable area changeover means for choosing one limited movable area from a first limited movable area between said limit position and a front end of a natural movable area of said master lens group and a second limited movable area between said limit position and a rear end of the natural movable area, and for enabling said master lens group to move under the rate control within the chosen limited movable area.

5. The TV camera lens as defined in claim 2, further comprising:

limit cancel means for canceling the limiting over the movement of said master lens group by said limit means; and movable area changeover means for choosing one limited movable area from a first limited movable area between said limit position and a front end of a natural movable area of said master lens group and a second limited movable area between said limit position and a rear end of the natural movable area, and for enabling said master lens group to move under the rate control within the chosen limited movable area.

6. A TV camera lens comprising:

position control means for position-controlling movement of a master lens group arranged in a lens mount;

rate control means for rate-controlling the movement of said master lens group;

position/rate control changeover means for choosing one of said position control means and said rate control means and for enabling the chosen control means to control said master lens group;

first limit means for limiting the movement of said master lens group with a first limit position which is set to a position adjusted by said position control means, when said rate control means rate-controls the movement of said master lens group;

limit position setting means for setting a second limit position;

second limit means for limiting the movement of said master lens group with the second limit position, when said rate control means rate-controls the movement of said master lens group.

7. The TV camera lens as defined in claim 6, further comprising limit cancel means for canceling the limiting over the movement of said master lens group by at least one of said first and second limit means.

8. The TV camera lens as defined in claim 6, further comprising movable area changeover means for choosing one limited movable area from a first limited movable area between said first limit position and a front end of a natural movable area of said master lens group and a second limited movable area between said first limit position and a rear end of the natural movable area, and for enabling said master lens group to move under the rate control within the chosen limited movable area.

9. The TV camera lens as defined in claim 6, further comprising:

limit cancel means for canceling the limiting over the movement of said master lens group by at least one of said first and second limit means; and movable area changeover means for choosing one limited movable area from a first limited movable area between said first limit position and a front end of a natural movable area of said master lens group and a second limited movable area between said first limit position and a rear end of the natural movable area, and for enabling said master lens group to move under the rate control within the chosen limited movable area.

* * * * *